United States Patent [19]  [11] 3,998,022
Muse  [45] Dec. 21, 1976

[54] INTERLOCKING BUILDING BLOCKS
[76] Inventor: George B. Muse, Hillcrest Drive, Calhoun, Ga. 30701
[22] Filed: Feb. 10, 1975
[21] Appl. No.: 548,385

Related U.S. Application Data
[63] Continuation-in-part of Ser. Nos. 252, Jan. 2, 1970, Pat. No. 3,864,885, and Ser. No. 462,376, , each is a continuation-in-part of Ser. No. 802,450, Feb. 26, 1969, Pat. No. 3,609,926, which is a continuation-in-part of Ser. No. 658,524, Aug. 4, 1967, Pat. No. 3,479,782, and Ser. No. 730,727, May 21, 1968, abandoned.
[52] U.S. Cl. .................................. 52/574; 52/564; 52/585; 52/609; 52/611
[51] Int. Cl.² ...................... E04C 1/10; E04C 1/16
[58] Field of Search ............ 52/438, 574, 585, 586, 52/429, 504, 564, 571, 609, 611, 563

[56]              References Cited
           UNITED STATES PATENTS
1,167,746  1/1916   Funsten ............................... 52/574
1,201,408  10/1916  White .................................. 52/574
1,327,584  1/1920   Bender ................................ 52/564
1,356,590  10/1920  Baumann ............................ 52/574
1,358,055  11/1920  Burke .................................. 52/504
3,110,131  11/1963  Jeffress ............................... 52/585
3,479,782  11/1969  Muse .................................. 52/438

FOREIGN PATENTS OR APPLICATIONS
960,569   10/1949  France ................................ 52/611
959,821   10/1949  France ................................ 52/564
999,177   10/1951  France ................................ 52/438
806,046    6/1951  Germany .............................. 585/
550,478   10/1956  Italy .................................... 52/609
311,727    2/1956  Switzerland ........................... 574/
188,990   11/1922  United Kingdom ................. 52/574

Primary Examiner—Alfred C. Perham
Attorney, Agent, or Firm—Jones, Thomas & Askew

[57]              ABSTRACT
Interfitting building blocks are disclosed of both T-shaped and Z-shaped configurations and both blocks define external slots, internal openings and corner bevels for receiving expandable locking elements. The blocks are arranged in a wall in stacked, overlying relationship in horizontal courses of blocks, and the courses of blocks are locked together with U-shaped clips extending between adjacent ones of the blocks in a single course, and vertically extending laterally expandable locking elements extending through adjacent courses of blocks. Mortar is poured down through the aligned openings in the blocks and the locking elements to hold the locking elements in their expanded positions.

6 Claims, 6 Drawing Figures

INTERLOCKING BUILDING BLOCKS

CROSS REFERENCE TO RELATED APPLICATIONS

This application is a continuation-in-part of application Ser. No. 252, filed Jan. 2, 1970, now U.S. Pat. No. 3,864,885, issued Feb. 11, 1975, and of application Ser. No. 462,376, filed Apr. 6, 1974, now abandoned, which applications are continuations-in-part of application Ser. No. 802,450, filed Feb. 26, 1969, now U.S. Pat. No. 3,609,926, issued Oct. 5, 1971, said application being a continuation-in-part of application Ser. No. 658,524, filed Aug. 4, 1967, now U.S. Pat. No. 3,479,782, and of application Ser. No. 730,727, filed May 21, 1968, now abandoned.

BACKGROUND OF THE INVENTION

In the past, walls formed from building blocks, etc., have been constructed by the placement of blocks upon one another, in overlying relationship and in courses of blocks with mortar interposed between the horizontal and vertical surfaces of the blocks. The construction of walls in this manner is tedious and requires a relatively skilled mason to form the wall upright and uniformly. When the wall has been formed, it is sometimes found that the wall is out of plumb or that the wall should be changed for some reason. Moreover, the horizontal strength characteristics of conventionally formed block walls is not particularly good unless the wall is fabricated from relatively thick blocks or unless the wall is formed with additional thickness of material, such as brick.

SUMMARY OF THE INVENTION

Briefly described, the present invention comprises a wall system and the building blocks, expandable locking elements, and U-shaped clips used to form the wall system. Building blocks of either T-shaped or Z-shaped configurations are utilized, and each block includes relatively large vertical internal openings which are alignable with the openings in the blocks in the course next above or next below, and relatively small vertical external openings or slots which are also alignable with the slots in the blocks in the courses next above or next below. The expandable locking elements comprise relatively large width U-shaped locking elements which can be inserted vertically and internally through the wall structure, through the large aligned internal openings of the blocks, and relatively small width U-shaped locking elements which can be inserted vertically and internally through the wall structure, through the smaller aligned slots in the blocks. In addition, the U-shaped clips internally of the wall in each course of blocks across the length of the blocks to connect together adjacent ones of the blocks in their nested double thickness of blocks.

Several courses of blocks are stacked together in a wall formation with the use of the U-shaped clips as necessary to hold the blocks together in each course of blocks so that the vertical openings which extend through each block are in alignment with similar vertical openings in the blocks in the adjacent courses of blocks, and the blocks in each course overly a portion of the blocks in the next adjacent courses of blocks. After the wall has been assembled, the wall is aligned as perfectly as possible so that it is substantially vertical, and the expandable locking elements are inserted down through the internal openings in the wall which is formed by the vertical openings of the blocks. The wall can be adjusted again after the insertion of the expandable locking elements, if necessary. Mortar is subsequently poured down through the same vertical openings in the wall, preferably down through the expandable locking elements so as to fill and lock or rigidify the expandable locking elements in their expanded condition. When the mortar has solidified, the wall becomes unusually strong in its resistance to horizontal shear forces.

The corners of the blocks are beveled and vertical grooves appear in the wall structure between the blocks in the same course of blocks, and mortar or plaster is sprayed or otherwise applied to the surface of the wall. The vertical grooves disguise any imperfection in the exterior surface of the finished wall structure due to any imperfections in block structure or the assembly of the blocks.

Thus, it is an object of the present invention to provide building blocks and locking elements that can be expediently and accurately assembled to form a wall without mortar, and wherein mortar can be subsequently added to the wall structure to lock the blocks in the wall together with an unusually strong bond.

Another object of the present invention is to provide a system of building walls wherein unusually strong walls can be expediently and precisely formed by relatively unskilled workmen.

Other objects, features and advantages of the present invention will become apparent upon reading the following specification, when taken in conjunction with the accompanying drawing.

DETAIL DESCRIPTION OF THE DISCLOSED EMBODIMENTS

Figure 1:
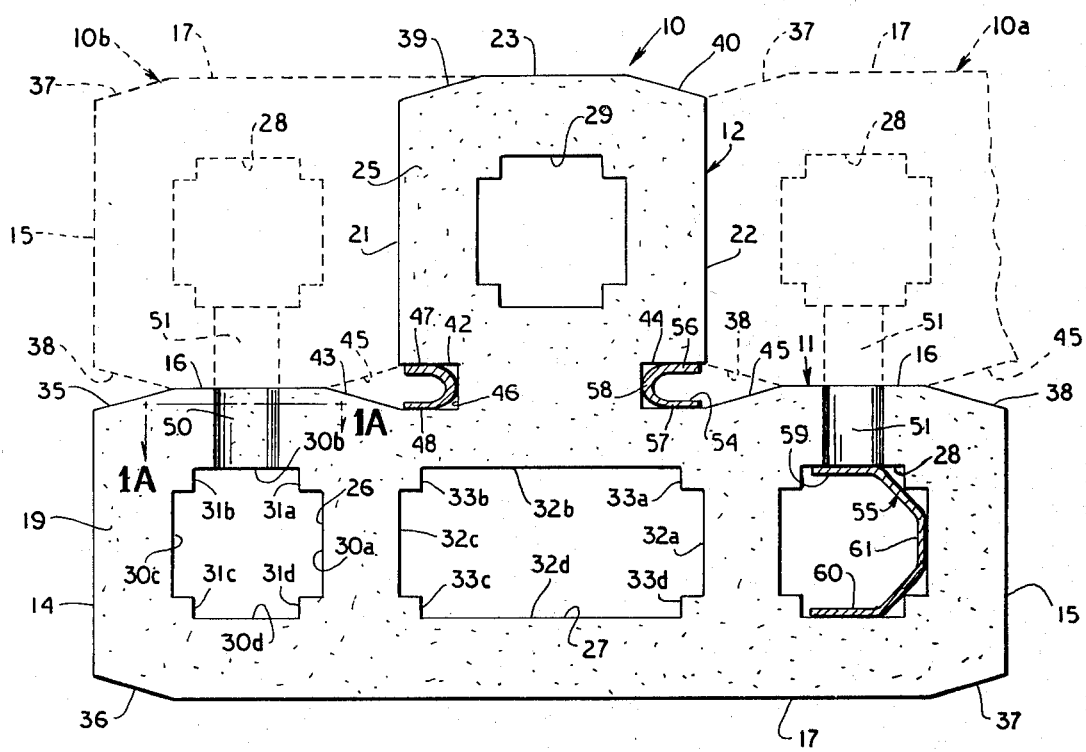
FIG. 1 is a top view of a single T-shaped block, with the upper left portion of the figure in dashed lines illustrating the block located in the course of blocks next below, and with the upper right portion of the figure in dashed lines illustrating the next adjacent block in the same course of blocks.

Referring now in more detail to the drawing figures, in which like numerals indicate like parts throughout the several views, FIG. 1 illustrates the top surface of an approximately T-shaped building block 10 which includes a main body portion 11 and a side body portion 12, with the side body portion 12 comprising the stem of the T-shape. The main body portion 11 is of a length approximately three times its width and includes vertical flat end walls 14 and 15, vertical flat side walls 16 and 17, and bottom and top surfaces 18 and 19. Side body portion 12 also includes vertical flat end walls 21 and 22, a vertical flat side wall 23, and bottom and top surfaces 24 and 25. Bottom and top surfaces 24 and 25 of side body portion 12 are coextensive with the bottom and top surfaces 18 and 19 of a main body portion. Side body portion 12 merges with the middle one-third of the main body portion 11.

In the particular embodiment illustrated, the main body portion 11 is approximately 4 inches in width and 12 inches in length and the side body portion is approximately 4 inches in both length and width. The height of the T-shaped building block is approximately 8 inches, and the overall width of both the main body portion 11 and the side body portion 12 is 8 inches. In order that the block be used in a wall structure so that each block occupies an 8 × 12 space length and width the wall structure, the length and width dimensions are slightly reduced so as to provide a small space between adjacent ones of the blocks in a course of blocks. For example, the overall width of the block is reduced to 7 15/16 inches while the overall length of the block is reduced to 11 15/16 inches. Of course, the block can be formed in other sizes while retaining the same basic proportions.

A plurality of vertical openings are formed in the block 10. Internal openings 26, 27 and 28 are formed centrally in each one-third of the length of main body portion 11, while internal opening 29 is formed centrally in the side body portion 12. Openings 26, 28 and 29 are of substantially identical size and shape, each including flat sides 30a, 30b, 30c and 30d, and intermediate inwardly proturding corners 31a, 31b, 31c and 31d. The internal opening 27 is similar to internal openings 26, 28, and 29, in that it includes flat side walls 32a, 32b, 32c and 32d, and intermediate corners 33a, 33b, 33c and 33d. While the flat sides of the internal openings 26, 28 and 29 are substantially equal in length, the flat sides 32b and 32d of internal opening 27 are longer than flat sides 32a and 32c, causing flat sides 32a and 32c to be in approximate alignment with the planes of end walls 21 and 22 of side body portion 12 of the T-shaped block. The sides of the internal opening which extend along the length of the main body portion 11 are approximately parallel to each other.

The vertical flat side walls of both the main body portion 11 and the side body portion 12 are beveled inwardly adjacent the vertical flat end walls. For example, vertical flat side wall 16 is beveled at 35 as the side wall merges with end wall 14, the vertical side wall 17 is beveled at its opposite ends at 36 and 37 as it merges with vertical end walls 14 and 15, the vertical side wall 16 is beveled at 38 as it merges with end wall 15, and the vertical side wall 23 of side body portion 12 is beveled at 39 and 40 as it merges with end walls 21 and 22. The bevels illustrated in FIG. 1 are approximately one inch in length along each respective side wall and one quarter inch in depth along each respective end wall.

A pair of slots 42 and 44 extend vertically through the T-shaped block 10. The slots 42 and 44 are positioned generally on opposite sides of side body portion 12 and on the same side of main body portion 11, at the intersection of the end walls 21 and 22 of side body portion 12 with the side wall 16 of main body portion 11. The vertical side wall 16 of main body portion 11 is beveled inwardly at 43 and 45 to merge with slots 42 and 44. Slots 42 and 44 are of similar shape and each includes inner wall 46 and side walls 47 and 48. The plane of the vertical flat side wall 16 of main body portion 11 bisects each inner wall 46 of slots 42 and 44, so that the side walls 47 and 48 of each slot 42 and 44 are located at equal distance on the opposite sides of the plane extending from the vertical flat side wall 16 through each slot. The bevels 43 and 45 formed adjacent each slot 42 and 44 is of the same size and shape as the bevels 35–40.

Recesses 50 and 51 are formed in the top surface 19 of the T-shaped block 10. Recess 50 intersects vertical opening 26 and vertical side wall 16, while recess 51 intersects vertical opening 28 and vertical side wall 16 and each recess is perpendicular to side wall 16. The particular recesses 50 and 51 which are illustrated in FIG. 1 are, in practice, five-eighths of an inch in width and three-eighths of an inch in depth; however, other dimensions can be used, as will become apparent.

Figure 2:
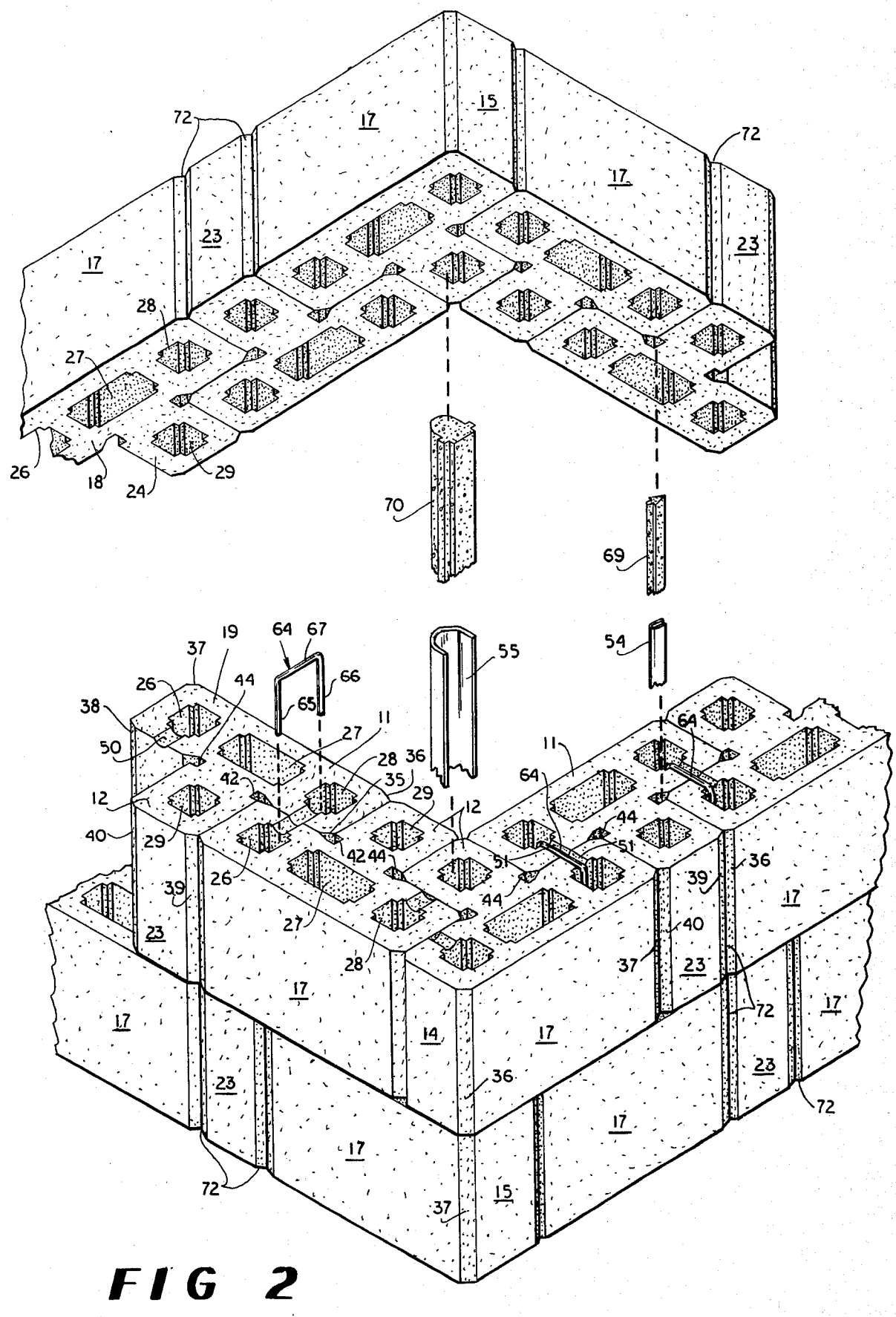
FIG. 2 is an exploded perspective view of a wall structure formed from T-shaped blocks of FIG. 1, showing a corner of a wall structure.

As is illustrated in FIG. 2, the T-shaped building blocks are usually arranged in an alternating relationship to form a wall structure, with the side body portion 12 of alternate ones of the blocks in a course of blocks placed in end-to-end relationship with the main body portion 11 of the other alternate blocks. The bevels 35 and 38 of the main body portion 11 will be located adjacent the slots 42 and 44 so that each slot 42 and 44 has its own bevel 43 and the bevel at the end of the next adjacent block positioned immediately exteriorally of the slot. This is illustrated in FIG. 1 where bevel 38 of the block 10a in the same course of blocks and illustrated in dashed lines is nested with the block 10.

Under normal circumstances, the T-shaped block will be arranged in vertical stacks of blocks, with alternate ones of the blocks in each stack facing an opposite direction. With this arrangement, the blocks in each course of blocks will overlie the end one-third portions of the main body portion of the blocks next above and next below in the next adjacent courses of blocks. The blocks in the courses next above and next below will have their vertically extending openings in alignment with each other. For example, FIG. 1 illustrates in dashed line a block 10b which is the block positioned in the course next below block 10, and it can be seen that its slot 44 is in alignment with slot 42 and its bevel 45 compliments bevel 43 of block 10. Also, its internal vertical opening 28 is located directly opposite to internal vertical opening 26 of block 10.

When a plurality of duplicate ones of the block 10 are placed in horizontal courses of blocks in the manner illustrated in FIG. 2, wherein the blocks are stacked vertically and with alternate ones in each vertical stack of blocks being faced in opposite directions, the vertical openings, including the internal vertical openings 26–29 and the external slots 42 and 44, will be in alignment with the internal vertical openings and slots formed in the blocks next above and next below. Usually, a wall will be assembled to a level of several courses of blocks, and then internal expandable locking elements will be inserted down through the aligned vertical openings of the blocks. The expandable locking element for the slots 42 and 44 comprise expandable tubular members 54, while the expandable locking element for the relatively large internal openings 26–29 comprise expandable tubular members 55. While the expandable locking elements 54 and 55 can be of closed tubular configuration and formed of resilient material so as to be wedged downwardly into the aligned vertical openings in the wall structure, the particular expandable tubular locking elements 54 and 55 are formed with a slot defined therein extending from end to end of each locking element, so that each of the locking elements 54 and 55 is approximately U-shaped in cross section and is compressible to a substantially closed or true tubular cross section. For example, expandable locking element 54 comprises sides 56 and 57 which are connected together by leg 58, so that sides 56 and 57 are movable toward and away from each other. In a similar manner, expandable locking element 55 includes sides 59 and 60 and leg 61. The junction between leg 61 and the sides 59 and 60 is sloped so that the sides 59 and 60 and leg 61 will fit flush against the interior sides of the vertical openings of the block and still accommodate the corner structures of the vertical openings.

U-shaped clips 64 are provided for locking adjacent blocks together in the same course of blocks. Each U-shaped clip includes side legs 65 and 66 and base leg 67. The clips 64 are positioned so that their base leg 57 is located in the aligned recesses 50 and 51, with the side legs 55 and 56 extending down into the internal vertical openings adjacent the recesses. This causes each block to be maintained in abutting relationship with respect to the block next adjacent in the same course of blocks. The recesses in the top surface of the block keep the U-shaped clips 64 from protruding above the upper surface of the block, so that the blocks in the course next above will rest flat upon the upper surface of the block and the clip will not inhibit the proper positioning of the blocks in the course next above.

As the blocks are arranged in a horizontal course as illustrated in FIG. 2, the U-shaped clips 64 are inserted in the recesses and internal vertical openings as illustrated, and the expandable locking elements 54 and 55 are inserted down through the aligned slots and openings in the wall structure. If a particularly strong wall structure is desired, both expandable locking elements 54 and 55 can be used; however, it is usually only necessary to utilize the smaller expandable locking elements 54. The workman can make whatever adjustments are necessary to be sure that the wall is properly aligned and is plumb during the insertion of the expandable aligning elements 54. After the workman is satisfied with the arrangement of the wall, mortar or other cementitious substance is poured down through the aligned slots 42 and 44, internally of the U-shaped expandable locking element 54 and allowed to harden. The mortar becomes hardened in a form somewhat similar to that illustrated at 69 in FIG. 2. In a similar manner, mortar can be poured down through the expandable locking elements 55, if used, and hardens in the form shown at 70 in FIG. 2.

The expandable locking elements 54 and 55 are fabricated from any suitable material, such as tin or other materials that have good shear resistant properties. Of course, the hardened motor inside the locking elements is substantially incompressible. Once the expandable locking elements 54 and/or 55 have been inserted down through the aligned openings in the wall structure and the mortar has been poured down through the locking elements and allowed to harden, the wall will become unusually strong in its shear resistant properties.

It will be noted from the drawing that the T-shaped building blocks 10 might be removable from the wall structure by pulling or pushing a block from its course of blocks, with the longer main body portion 11 being moved laterally out from the wall structure and the smaller side body portion 12 following; however, the expandable locking elements 54 inserted down through the aligned slots 42 and 44 in the wall structure lock each block in the wall structure so that it is impossible to remove a block from the wall structure without rupturing either the block or the locking element and its internal core of hardened mortar.

The beveled side surfaces of the T-shaped building block 10 form external vertical grooves throughout the wall structure. For example, external vertical groove 72 is formed by bevels 36 and 39 of the adjacent blocks. The grooves create an interesting and attractive design in the wall structure. Also, if one of the blocks should be slightly misaligned or should be slightly smaller or larger than normal, its side surface might be recessed or might protrude from the wall structure. For example, the side surface 23 of one of the blocks (FIG. 2) might be slightly recessed from the plane of the wall surface. If there were no external vertical grooves 72 formed in the wall structure, the fact that the side surface 23 of the block was recessed with respect to the plane of the wall surface would cause the wall surface to have a visibly noticeable recessed area therein. Since the external vertical grooves 72 are formed between adjacent ones of each block in each course of blocks, the external vertical grooves 72 disguise any slight imperfections in the wall surface which might otherwise be caused by slight recesses or slight protrusions of some of the blocks in the structure. Moreover, the walls formed with the T-shaped building blocks 10 are frequently covered or coated with a mortar or plaster, and the usual manner in applying such a plaster is with a spray device. The spray applied to the wall surface will not disguise any protrusions or recesses in the wall surface without special attention. Thus, the external vertical grooves formed in the wall surface function to disguise any such protrusions or recesses when the plaster is applied to the external surface of the wall.

When the mortar or plaster is applied to the external surface of a wall formed by the T-shaped building blocks, the mortar also helps to hold the blocks in rigid relationship with respect to one another, thereby strengthening the wall structure. Moreover, the presence of the external vertical groove 72 causes the mortar to assume more than just a flat or planar surface, and this configuration of the mortar further helps to strengthen the wall structure and bond the blocks together.

Figure 3:
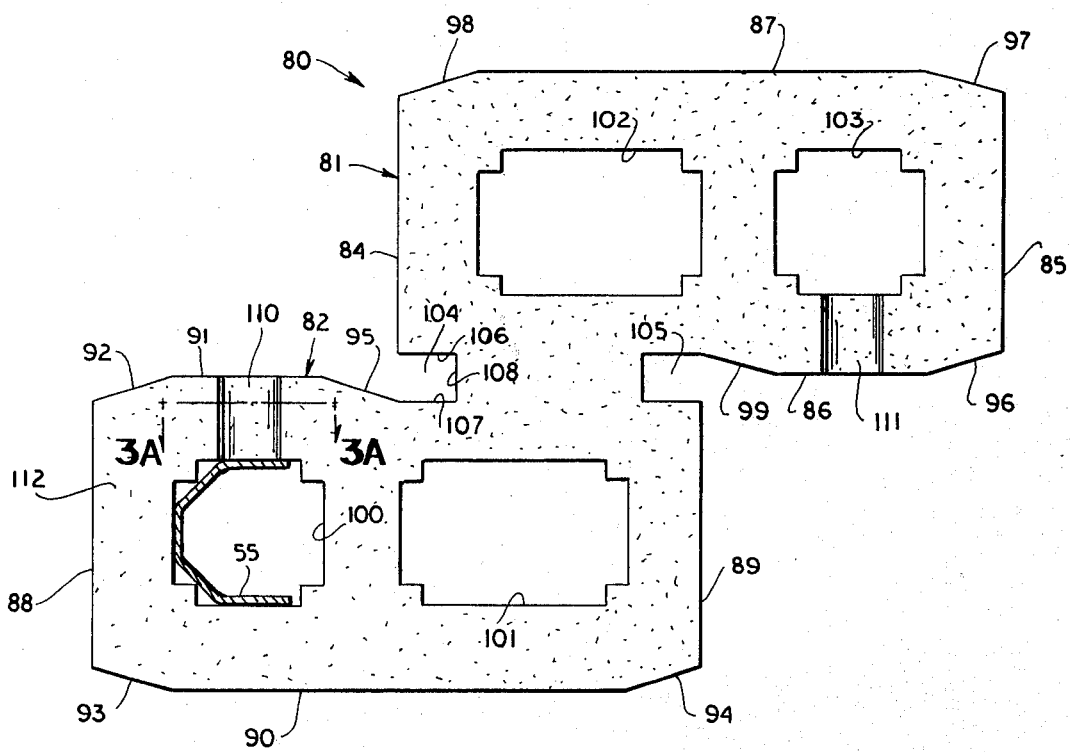
FIG. 3 is a top view of a Z-shaped building block.
Figure 1A:
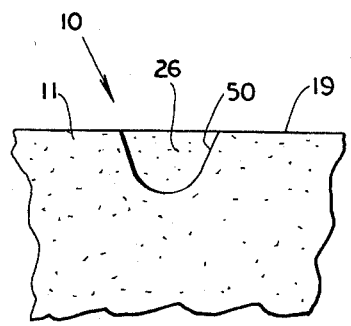
FIG. 1A is a detail illustration of a recess in the top surface of the T-shaped block of FIG. 1.
Figure 3A:
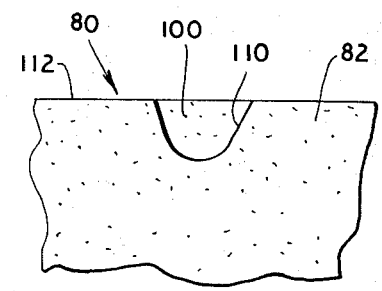
FIG. 3A is a detail illustration of a recess of the top surface of the Z-shaped building block of FIG. 3.

As is illustrated in FIG. 3, a Z-shaped building block 80 is disclosed which includes many of the same features of the T-shaped building block 10. The Z-shaped building block 80 includes a pair of identical body portions 81 and 82, with each body portion being of a length approximately twice its width and each body portion being offset by one-half its length with respect to the opposite body portion. Body portion 81 includes end walls 84 and 85 and side walls 86 and 87. Body portion 82 includes end walls 88 and 89 and side walls 90 and 91. The side walls of both body portions are beveled at 92, 93, 94, 95, 96, 97, 98, and 99. Relatively large internal vertical openings 100, 101, 102 and 103 are formed centrally in each one-half portion of each body portion, and slots 104 and 105 are formed on opposite sides of the connection between the body portions 81 and 82. Slots 104 and 105 each include internal side walls 106 and 107 and inner wall 108. The plane of side walls 91 and 86 of the body portions bisect the slots 104 and 105. Recesses 110 and 111 are formed in the top surface of the block and extend from the end internal openings 100 and 103 to the side walls 91 and 86 which face the opposite body portion. The recesses are perpendicular to the planes of the side walls 91 and 86.

Figure 4:
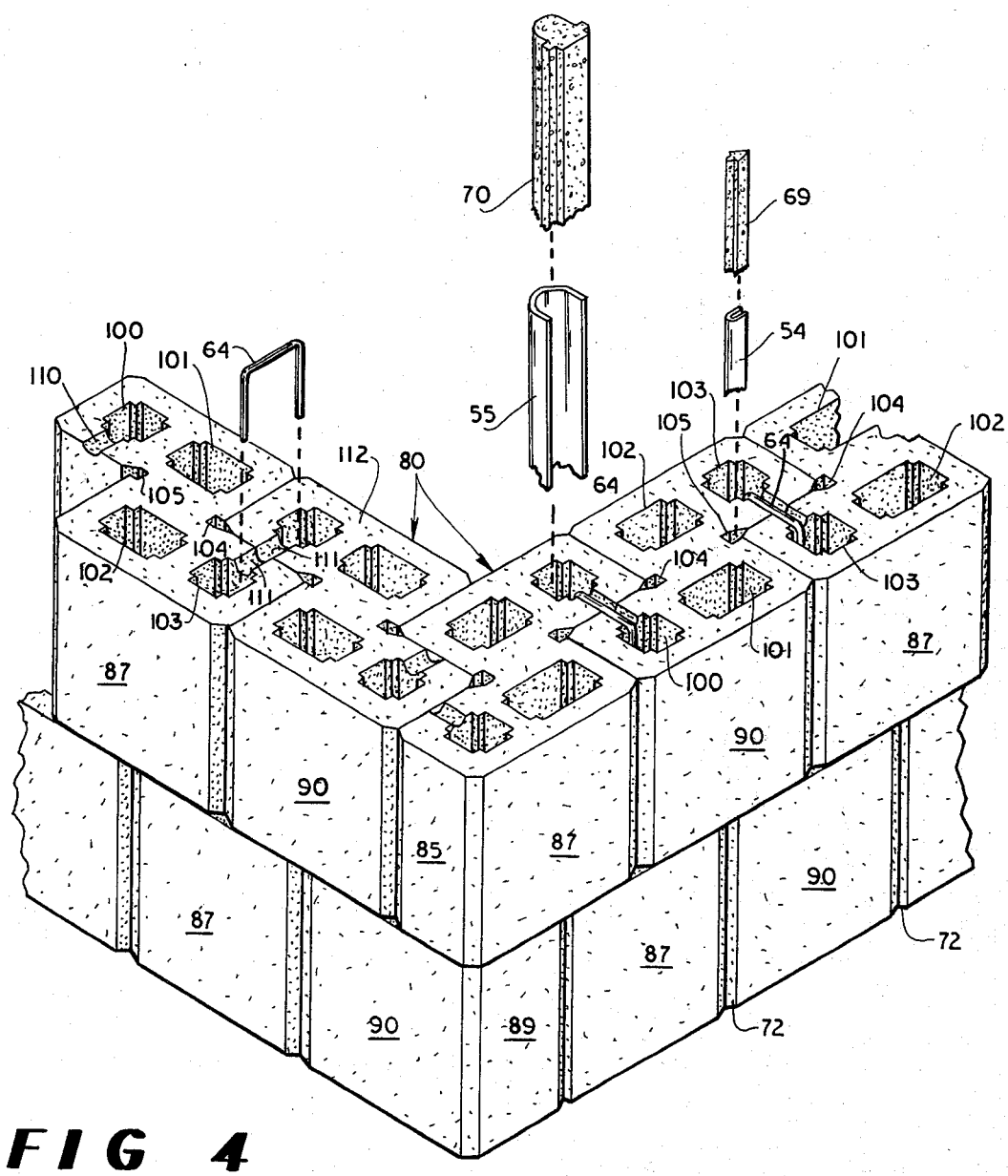
FIG. 4 is an exploded perspective view of a wall structure fabricated from Z-shaped building blocks of FIG. 3, showing a corner of the wall structure.

As is illustrated in FIG. 4, the Z-shaped building blocks 80 are placed in abutting relationship in horizontal courses of blocks, so that the protruding ends of each block are nested in the next adjacent blocks. The same type of U-shaped clips 64 that are used with the T-shaped blocks previously described are placed in the recesses 110 and 111 of the abutting block so as to hold their facing surfaces together in each course of blocks. The same type of expandable tubular locking elements 54 and 55 are inserted downwardly through the aligned slots 104 and 105 and the aligned internal openings 100–103. A cementitious substance, such as mortar, is poured down through the expandable tubular locking elements and allowed to harden. The expandable locking elements function to lock the Z-shaped building blocks together in the wall structure, so that the wall structure forms an unusually strong shear resistant wall, as previously described with respect to the T-shaped block. Moreover, the external characteristics of the wall structure formed by the Z-shaped block includes similar advantages with respect to appearance and strength.

The Z-shaped and T-shaped blocks can be used in combination with each other when desired. For example, in a wall formed of T-shaped blocks, if Z-shaped blocks are placed in the corner of the wall structure in every other course of blocks, the external vertical grooves formed by the bevels 39 and 40 of the T-shaped blocks will be positioned out of alignment with the external grooves formed by the bevels of the blocks next above and next below.

While this invention has been described in detail with particular reference to preferred embodiments thereof, it will be understood that variations and modifications can be effected within the spirit and scope of the invention as described hereinbefore and as defined in the appended claims.

I claim:

1. An approximately T-shaped symmetrical building block comprising an elongated main body portion of a length substantially three times its width with vertical end walls and vertical side walls intersecting a side body portion of a length and width each approximately equal to the width of said main body portion and extending from one side of said main body portion and including vertical end walls intersecting a vertical side wall, a pair of vertical external slots formed in and extending through said building block with each slot positioned inwardly of the junction of a vertical side wall of the main body portion and a vertical end wall of the side body portion and both slots extending inwardly of the planes of the vertical end walls of the side body portion and partially offset inwardly of the plane of the vertical side wall of the main body portion with the openings of the slots facing in opposite directions toward the ends of the block, the side wall of said main body portion facing said side body portion being beveled adjacent said side body portion with the beveled portions merging with said slots, the side walls of said main body portion being beveled at the intersection of each side wall with each end wall of said main body portion, and the side wall of said side body portion being beveled at the intersection of the side wall with each end wall of said side body portion, whereby when duplicate ones of the block are arranged in a double thickness of blocks in a single course of blocks with alternate ones of the blocks having their side body portions positioned in abutting end-to-end relationship with respect to the main body portions of the other blocks, the beveled portions of the main body portions of each block will be located adjacent a slot and its merging beveled portion of the adjacent block, and when duplicate ones of the blocks are stacked one upon the other with alternate ones of the blocks facing in opposite directions, the slots of the blocks will be aligned with the blocks next above and next below.

2. The T-shaped building block of claim 1 and further including internal vertical openings extending centrally through each one-third of the length of said main body portion and centrally through the side body portion, and recesses formed in the top surface of said building block extending from the internal vertical opening in each end one-third portions of the main body portion to the vertical side wall adjacent the side body portion, whereby when duplicate ones of the block are nested in a single course of blocks with alternate ones of the blocks having their side body portions positioned in abutting end-to-end relationship with respect to the main body portions of the other adjacent blocks, the recesses of the top surfaces of adjacent blocks will be in alignment with each other.

3. A wall structure or the like comprising a plurality of duplicate approximately Z-shaped building blocks each including approximately rectangular body portions of a length approximately twice its width with each body portion offset by one-half of its length with respect to the opposite body portion, vertical openings extending centrally through each one-half of the length of each body portion and recesses formed in the top surface of each body portion and extending from the vertical openings in the end one-half of the main body portion toward the side thereof adjacent the other body portion, a pair of external slots formed in and extending vertically through each of said building blocks at the intersection of the end wall of one body portion with the side wall of the other body portion with each slot positioned inwardly of the plane of the end wall of one body portion and the plane of a side wall of the other body portion bisecting the slot, said blocks being arranged in horizontal courses of blocks with the blocks in each course overlying the blocks in the next adjacent courses and the external slots in vertical alignment with each other and with the end surfaces of each body portion of the blocks in the same course positioned in end-to-end relationship with the end surfaces of body portions adjacent ones of the others of the blocks whereby the recesses formed in the top surfaces of the body portions of the blocks are positioned in approximate alignment with the recesses of the next adjacent blocks, and a plurality of U-shaped clips each including side legs and a connecting leg, said clips being inserted into the wall structure with each clip having its connecting leg positioned in the aligned recesses of adjacent ones of the blocks and its side legs extending into a vertical opening in the blocks, whereby the facing side surfaces of adjacent blocks in the course of blocks are urged into abutment with each other.

4. A T-shaped symmetrical building block comprising an elongated main body portion of a length substantially three times its width with vertical side walls and vertical end walls and a side body portion extending from one side of said main body portion and of a length and width each approximately equal to the width of said main body portion and including vertical side walls and vertical end walls, a pair of slots formed in and extending vertically through said building block with each slot positioned inwardly of the junction of a vertical side wall of the main body portion and a vertical end wall of the side body portion with the plane of the vertical side wall of the main body portion bisecting the slots, whereby when duplicate ones of the block are stacked in an alternating arrangement with the side body portion of alternate blocks in the stack facing opposite directions the slots of the blocks in the stack are in vertical alignment.

5. The building block of claim 4 and wherein the side walls of said main body portion are beveled at the intersection of each side wall with each end wall of said main body portion, and wherein the side wall of said side body portion is beveled at the intersection of the side wall with each end wall of said side body portion, and wherein the side wall of the main body portion adjacent the side portion is beveled at the slots, whereby when duplicate ones of the block in a course of blocks arranged with the end walls of a main body portion of each block in abutting relationship with the end walls of a side body portion of the next adjacent block have the bevels at the intersection of the side wall of the main body portion with the end wall located adjacent the bevels at the slots.

6. The building block of claim 4 and further defining openings extending vertically through the end one-third portions of said main body portion, and recesses formed in the top surface of the block and extending between said openings and side wall of said main body portion adjacent said side body portion.

* * * * *